June 28, 1932.  R. F. MARTLIN  1,864,919
MACHINE FOR MAKING MOLDED PULP ARTICLES
Filed May 2, 1929   6 Sheets-Sheet 1
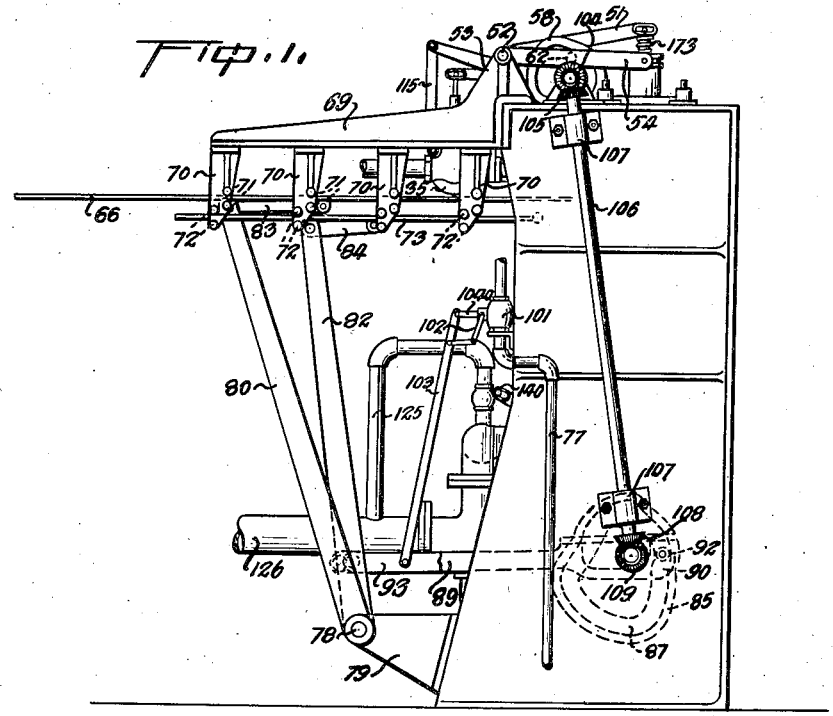
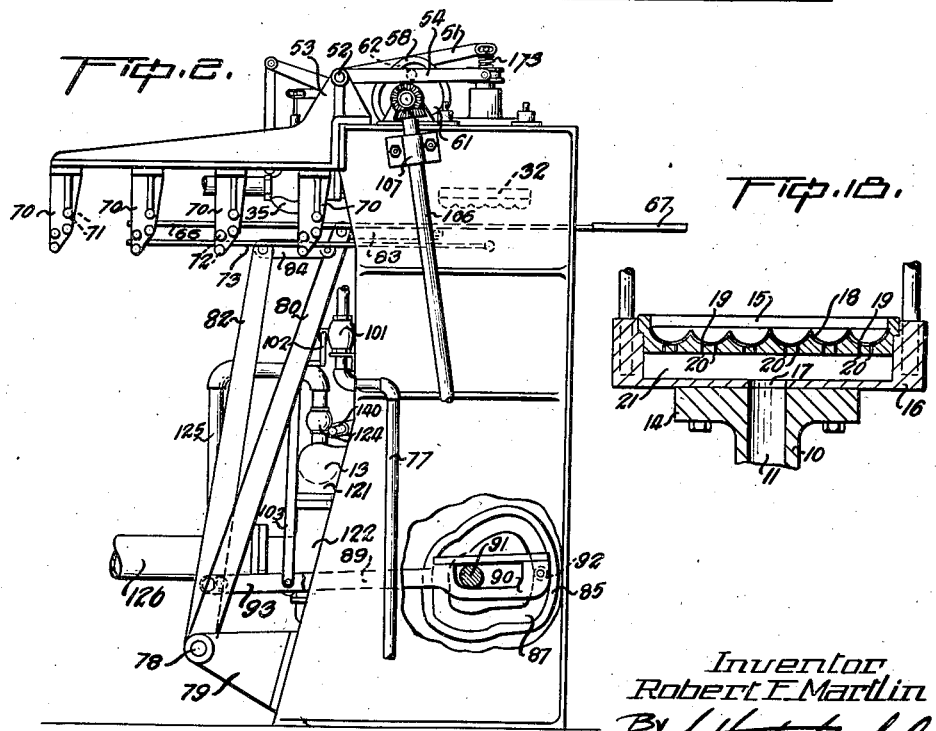
Inventor
Robert F. Martlin

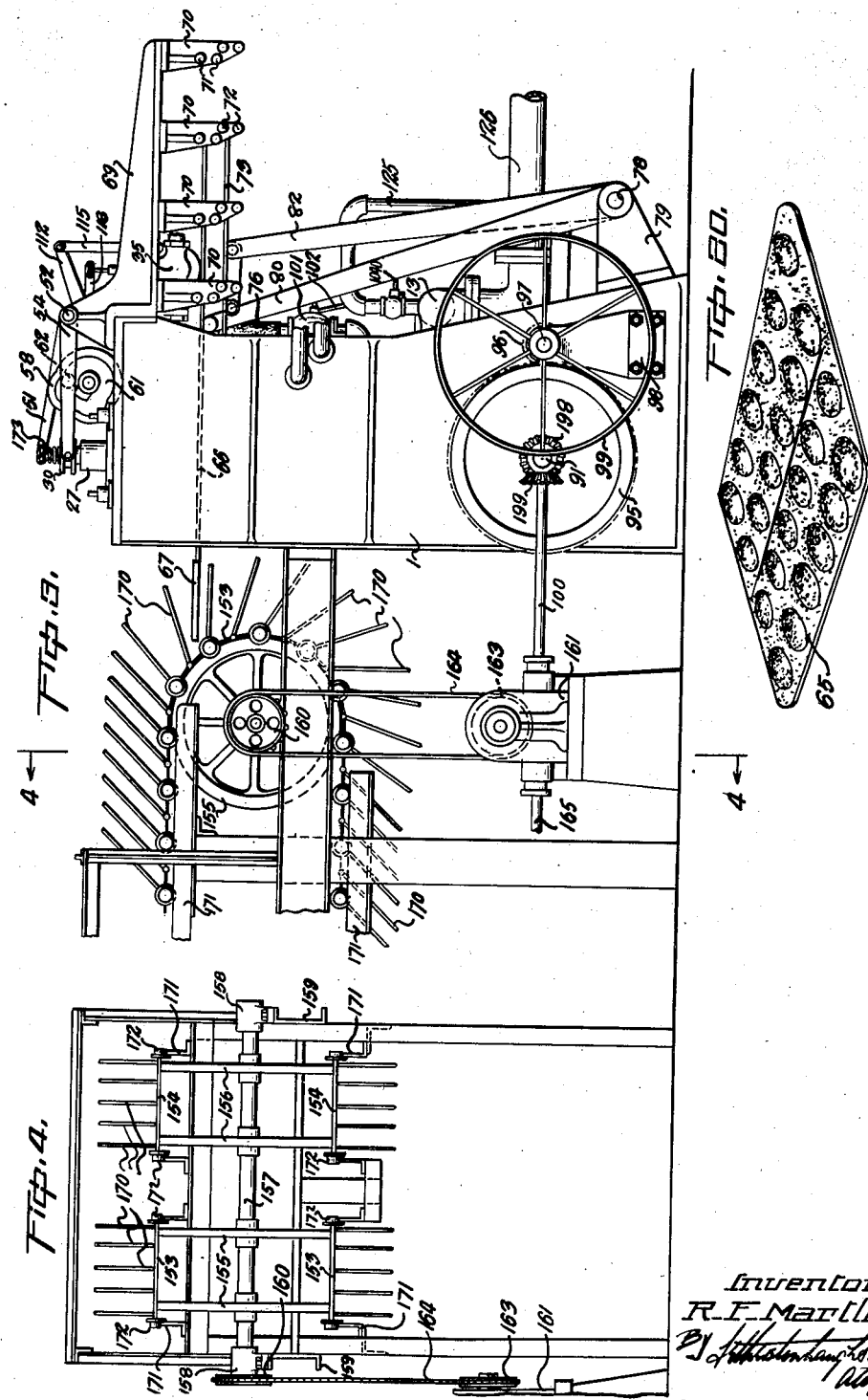

June 28, 1932.  R. F. MARTLIN  1,864,919
MACHINE FOR MAKING MOLDED PULP ARTICLES
Filed May 2, 1929    6 Sheets-Sheet 3
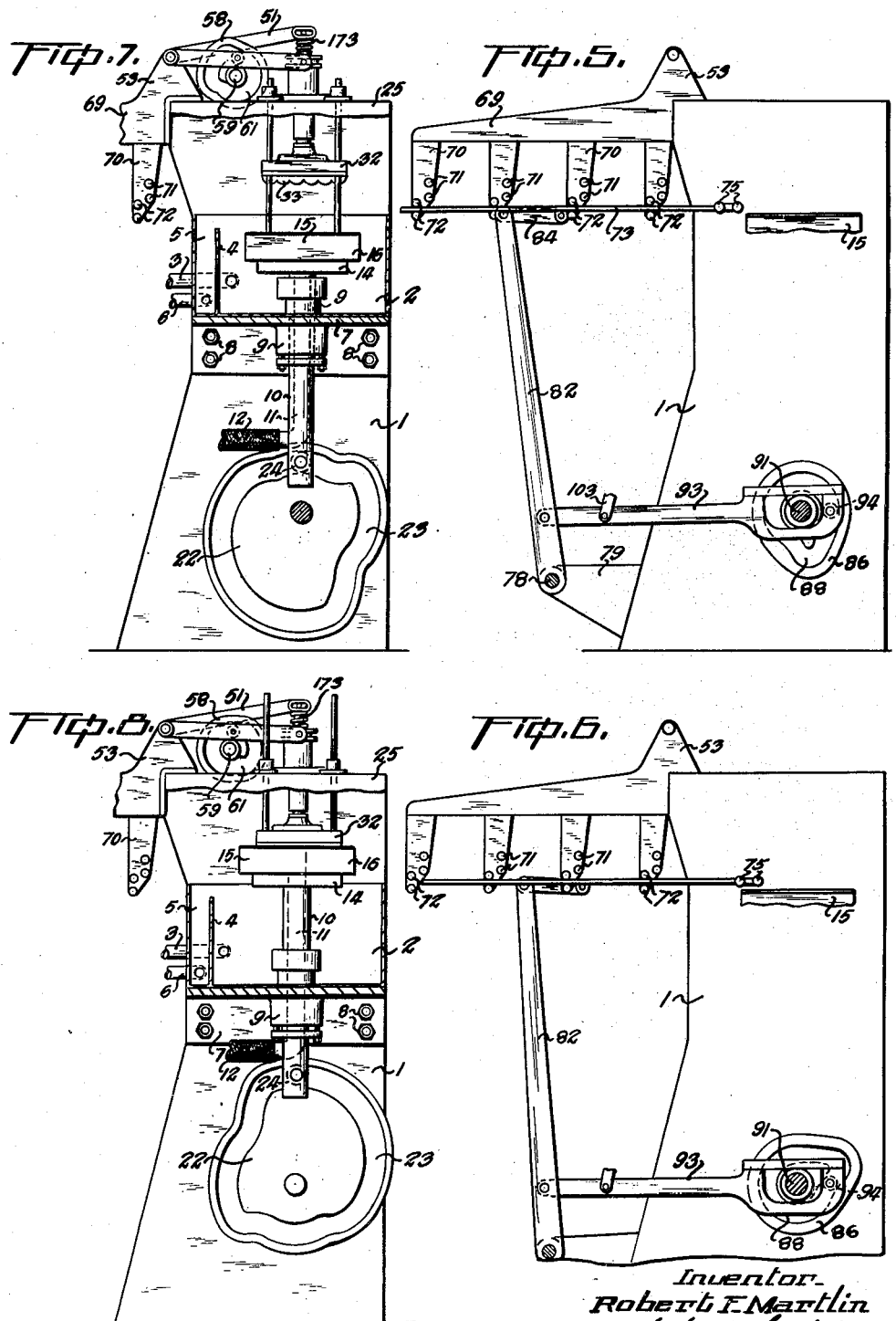

June 28, 1932. R. F. MARTLIN 1,864,919
MACHINE FOR MAKING MOLDED PULP ARTICLES
Filed May 2, 1929 6 Sheets-Sheet 4
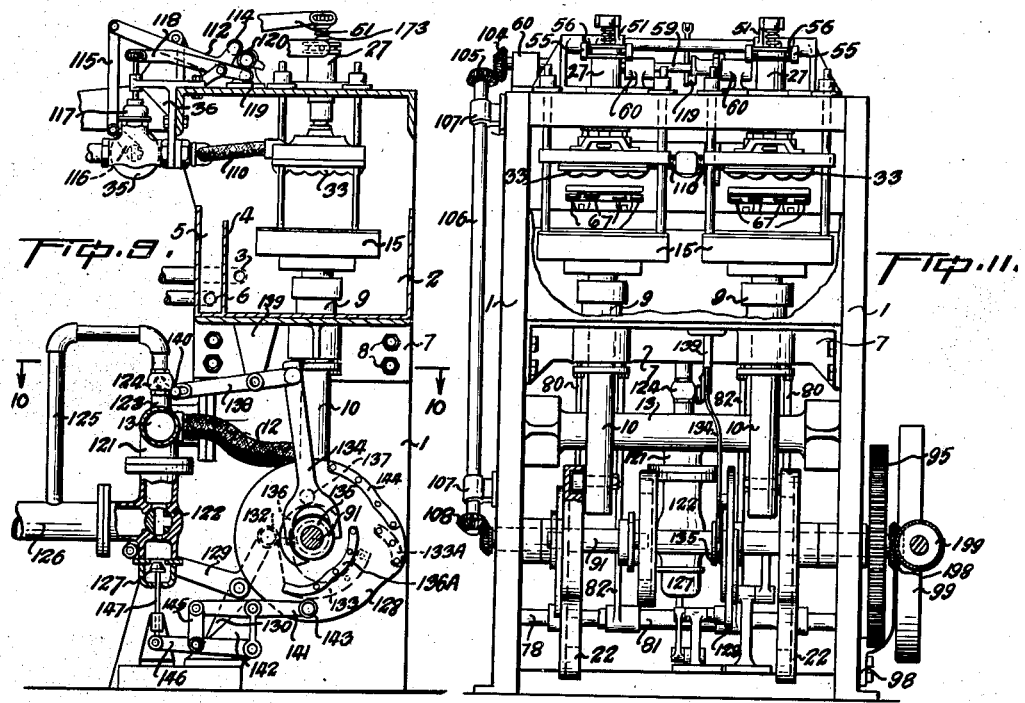
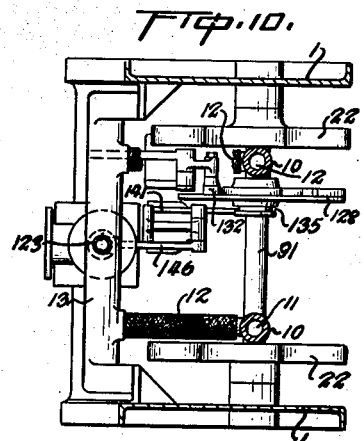
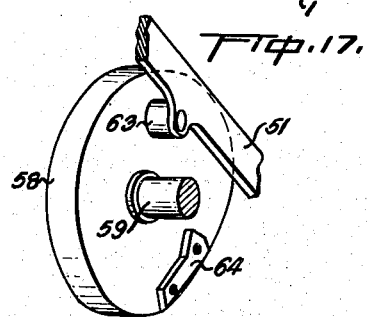
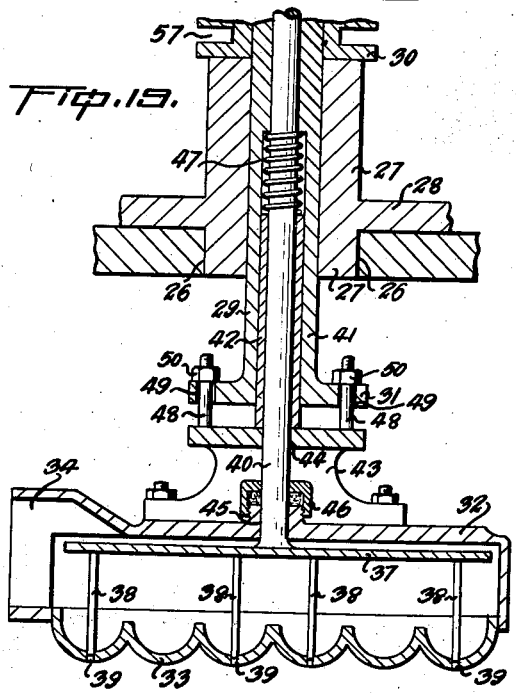
Inventor
Robert F. Martlin Inventor
Robert F. Martlin

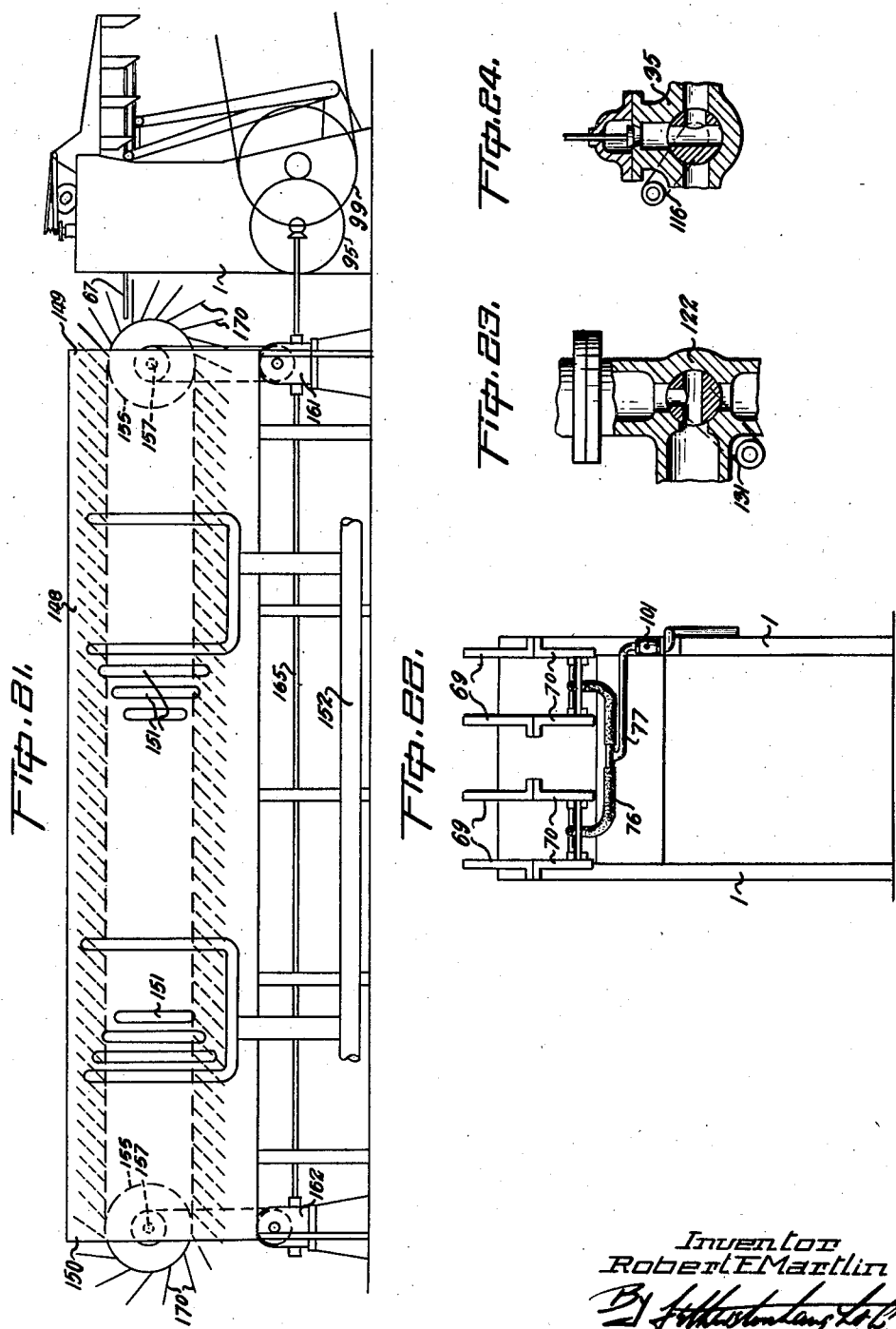

Patented June 28, 1932

1,864,919

UNITED STATES PATENT OFFICE

ROBERT FREDERICK MARTLIN, OF HAMILTON, ONTARIO, CANADA, ASSIGNOR TO JOHN HARVEY PICKETT, OF HAMILTON, ONTARIO, CANADA

MACHINE FOR MAKING MOLDED PULP ARTICLES

Application filed May 2, 1929. Serial No. 359,847.

My invention relates to improvements in machines for making molded pulp articles, and the object of my invention is to construct a wholly automatic machine which will receive liquid pulp mixture, withdraw the water therefrom, mold the pulp into the article which is being made and deliver such article into a drying receptacle or oven through which it slowly passes and emerges completely molded, dried and ready for shipment.

A further object of my invention is to produce a machine of this type in which the female mold has a substantially vertical reciprocatory movement in and out of the pulp mixture liquid.

A further object of my invention is to incorporate a spray washer in my machine whereby the female mold which submerges in the pulp mixture liquid and in which the molded pulp article is formed, is washed clear of all residue pulp which may remain in any of its crevices before it again submerges into the pulp mixture liquid. Another object of my invention is to provide a male mold complementary to the female mold and upon which the molded article is received from the female mold, a thrust member being incorporated within such male mold whereby such article is removed therefrom to a carrier which delivers it into the drier.

A still further object of my invention is to provide the aforementioned carrier with a substantially horizontal reciprocatory movement wherein it performs a dual function in receiving the molded article at one portion of its stroke upon another portion of its stroke delivering it to a conveyor upon which it is carried into the drier.

Another object of my invention is to so construct the conveyer which passes through the drier that it receives the molded articles which are lying in a substantially horizontal position upon the carrier and swings them into a substantially vertical position as they pass into the drier; whereby a greater number of articles may be contained upon the carrier in the drier than would be the case if such articles were carried through the drier in a substantially horizontal position lying edge to edge instead of side face to side face. This particular arrangement of the carrier permits the drier to be made much shorter in length than otherwise would be the case; as the articles have to be subjected to the drying heat for a considerable length of time.

My invention consists of a machine for making molded pulp articles constructed and arranged all as hereinafter more particularly described and illustrated in the accompanying drawings, in which:—

Fig. 1 is a side elevational view of the molding portion of my device, the drier not being shown.

Fig. 2 is a similar view to Fig. 1, showing the article receiving carrier moved forwardly into the drier, the side member of the machine being broken away to disclose the cam which actuates the carrier lever.

Fig. 3 is a similar view to Fig. 2, the opposite side of the molding machine being shown, the mechanism thereof being in the same position as that illustrated in Fig. 2, a portion of the drier conveyer being also shown.

Fig. 4 is a vertical cross sectional view through the drier conveyer, taken through the line 4—4, Fig. 3.

Fig. 5 is a partially diagrammatic view of a cross section through the machine showing the spray carrier and the cam and lever mechanism that actuates the carrier.

Fig. 6 is a similar view to Fig. 5, showing the spray at one part of its travel across the face of the female mold.

Fig. 7 is a cross sectional view through the molding portion of the machine, showing the male and female molds separated, and the cams by means of which such molds are actuated.

Fig. 8 is a similar view to Fig. 7, showing the molds in the engaged position, or final movement of the molding operation.

Fig. 9 is a somewhat similar view to Fig. 7, the suction and pulp feeding apparatus and the cams for controlling such apparatus being shown.

Fig. 10 is a horizontal cross sectional view taken through the line 10—10, Fig. 9.

Fig. 11 is an end elevational view of the molding machine, the article delivery end of the machine being shown.

Fig. 17 is a perspective view of the cam for operating the delivery mechanism in the male mold.

Fig. 18 is an enlarged vertical cross sectional view through the female mold.

Fig. 19 is a further enlarged vertical cross sectional view through the male mold showing the delivery mechanism contained therein.

Fig. 20 is a perspective view of an egg container or carrier of the type produced from the molds shown incorporated in my machine.

Fig. 21 is a side elevational diagrammatic view of my molding machine and drier.

Fig. 22 is a diagrammatic end elevational view of the molding machine, being taken from the opposite end to that shown in Fig. 11.

Fig. 23 is an enlarged vertical cross sectional view through the main suction valve for the female mold, and Fig. 24 is an enlarged vertical cross sectional view through the suction valve for the male mold.

Like characters of reference indicate corresponding parts in the different views.

Figure 12:
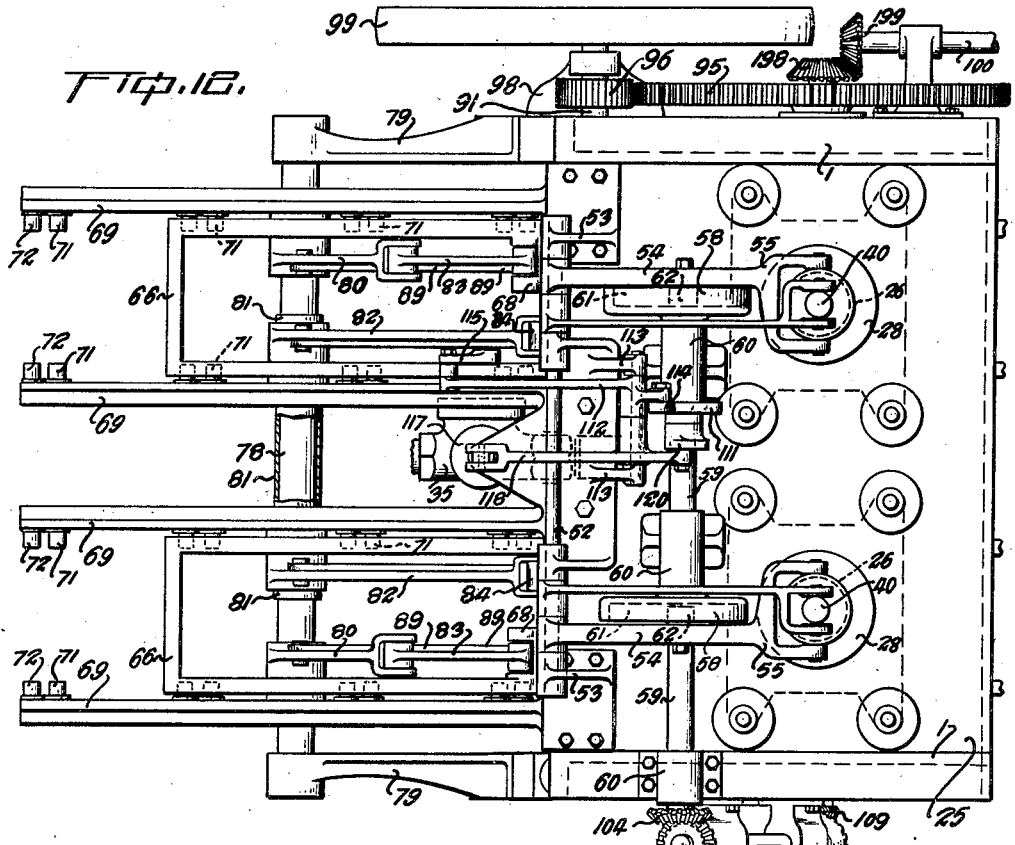
Fig. 12 is an enlarged plan view of the molding machine.

My molding machine as illustrated in the accompanying drawings is of the twin type, in other words there are two carriers for delivery to the drier, two conveyers in the drier, two sets of molds, and two sprays for washing the female molds. These pairs are all actuated simultaneously so that two molded articles are formed at the same time, and as these pairs of parts are similar in construction except that they are opposite in form where the construction so necessitates, I will indicate each part as shown in the different views of my device, but will only speak of a singular molding operation in the description of its operation.

My machine primarily consists of a device comprising a female mold which reciprocates vertically into and out of a tank containing pulp liquid; the female mold being filled with such liquid, and after its submersion the water is drawn off leaving the pulp cake upon the mold, a male mold which comes into contact with the pulp cake in the female mold and sucks it therefrom on to itself, and a horizontal slidable carrier which passes under the male mold after the female mold moves downwardly and receives the molded article which is pressed off the male mold and carries such molded article into the path of a conveyer which lifts the article from off the carrier and conveys it into the drier. Whilst the molded article is being carried into the path of the conveyer a water spray passes over the face of the female mold and washes off any pulp which is left adhering thereto, then such female mold sinks into the liquid pulp preparatory to molding the next article. As the molds illustrated are formed for making egg carriers or containers I shall hereafter describe such articles as egg containers, it being of course understood that any desired pulp articles can be made in the same manner by substituting the required molds.

My molding mechanism is supported by and contained between a pair of vertically spaced apart side plates 1 which support a substantially rectangular pulp liquid containing tank 2 which is positioned therebetween intermediately of their height. This tank is supplied with liquid pulp through an inlet pipe 3 and to prevent overflowing is furnished with a partition 4 which extends thereacross and forms an overflow receptacle 5 which is furnished with a waste pipe 6 extending to a recirculation tank (not shown) and then to the source of the liquid pulp supply which fills the tank through the pipe 3. The partition 4 being of course of a less height than the walls of the tank but being of a height sufficient to keep a proper depth of pulp liquid within the tank at all times. The tank is supported upon a bridge piece 7 which extends between the side plates 1 and is secured thereto by bolts 8. This bridge piece is formed with a pair of spaced apart sleeves 9 which extend upwardly into the tank, being of course made water tight around the orifices in the tank through which they project. These sleeves 9 carry a pair of reciprocatory barrels 10 which project into the tank and carry upon their upper ends the female molds. The sleeves 9 are of course formed with a gland packing structure to prevent leakage between the sleeves and the barrels, but as such packing structure is of the conventional type I do not deem it necessary to show or describe its particular construction.

The barrels 10 are hollow, having bores 11 extending therethrough, the lower ends of such barrels being closed and connected a little above the closure with flexible conduits 12 which extend to a cross pipe 13 having closed ends and supported between the side plates 1. The upper ends of the barrels are formed with flanges 14 upon which the female molds 15 are supported.

These female molds of course can be of any suitable construction and shape, depending upon the article being molded and the particular type of mold used. The type of mold illustrated in Fig. 18 consists of a box shaped portion 16 having an orifice 17 in its bottom which communicates with the bore 11 in its supporting barrel. Across the open face of the box shaped portion 16 an egg container mold 18 is supported, such mold being of a shape to produce the type of egg container illustrated in Fig. 20. The type of mold illustrated is formed in its molding face with a plurality of very small corrugations 19 which communicate with drainage orifices 20 extending to the suction chamber 21 which communicates with the bore of the supporting barrel.

The barrels are actuated in their reciprocatory movement by a pair of cams 22, these cams are substantially of the shape illustrated in Figs. 7 and 8, and are each formed upon one face with a channel 23 in which rollers 24 carried upon the ends of the barrels 10 are contained.

Extending between the upper edges of the side plates I furnish a top plate 25 which is formed with a pair of orifices 26 each positioned centrally above one of the barrels 9 and containing a sleeve 27 furnished with a flange 28 which is secured upon the top face of the plate 25. Each of these sleeves 27 carries a second sleeve 29 which is reciprocable therein and furnished upon its upper end with a grooved member 30, the lower ends of the sleeves 29 being formed with flanges 31.

The sleeves 29 are designed to support the male molds which each consist of an open bottomed box member 32, such open mold members 33 being provided with male mold members 33 which are complementary to the female molds 18. The boxes 32 are each furnished upon their rear face with an outlet neck 34 which is connected with a valve 35 supported upon a bracket 36 secured upon the rear edge of the top plate 25. Inwardly of the mold boxes 32 I position plates 37 having a plurality of fingers 38 which extend downwardly from their lower faces and project through a plurality of orifices 39 in the male mold members 33. The plates 37 are supported upon the lower ends of rods 40 which extend upwardly through the sleeves 29, such sleeves 29 being of increased interior diameter at their lower ends 41 to permit the insertion of sleeves 42. Upon the top of the mold boxes 32 bridge pieces 43 are secured and have orifices 44 therein through which the rods 40 extend. The orifices 45 in the mold boxes 32 through which the rods also extend are provided with suitable packing boxes 46.

The sleeves 42 extend upwardly into the sleeves 29 from the upper faces of the bridge pieces 43 and surround the rods 40. These sleeves 42 are not as long as the enlarged interior portions of the sleeves 29, and in the spaces between the tops of the sleeves 42 and the tops of such enlarged inner portions I furnish spiral springs 47 which encircle the rods and rest upon the tops of the sleeves 42. Upon the tops of the bridge pieces 43 I furnish a plurality of upwardly extending studs 48 which freely project through the orifices 49 in the flanges 31 and are furnished with nuts 50 upon their upper ends.

Upon reference to Fig. 19 in which the before described male mold assembly is illustrated, it will be seen that the provision of the studs 48 extending freely through the orifices 49 in the flange 31 upon the lower end of the fixed sleeve 29, and also the provision of the slidable sleeve 42 contained within such fixed sleeve and in contact with the spiral spring 47, that a certain upward movement of the mold box 32, bridge 43, and sleeve 42 against the resiliency of the spring 47 may be obtained. This assembly permits the male mold adjusting itself to accommodate the slightly different thickness of pulp within the female mold when it comes into contact with the male mold, and also the upward movement of the female mold and the male mold against the resiliency of the spring 47 helps to tightly compress the pulp.

The upper ends of the rods 40 project upwardly through the grooved members 30 and are connected to levers 51 pivoted upon a rod 52 which is supported above the top plate 25 in a pair of brackets 53. 54 are a second pair of levers pivotally mounted at one end upon the rod 52 and formed with bifurcated members 55 at their opposite ends which are adapted to straddle the grooved members 30, such bifurcated ends being formed with inwardly extending pins 56 which extend into the grooves 57 in the members 30.

For swinging the levers 51 and 54 about the rod 52 I furnish a pair of cams 58 which are secured upon a shaft 59 extending across the upper face of the top plate 25 in parallel relation to the rod 52, such shaft being supported in a plurality of bearings 60. The cams 58 are formed with grooves 61, and the levers 54 are furnished with rollers 62 intermediately of their length which ride in such grooves.

For actuating the levers 51 I utilize a trip of the form illustrated in Fig. 17, wherein I provide rollers 63 upon the faces of the levers 51 adjacent to the flat faces of the cams 58, and upon such flat faces secure trip members 64 which are adapted to come in contact with the rollers 63 and momentarily depress the levers 51. As the levers 54 are connected to the upper ends of the rods 40 which extend into the male mold members and support the finger containing plates 37, it will be appreciated that the momentary depression of the levers 51 will move the rods 40 downwardly which in turn will move the fingers 38 outwardly through the orifices 39 and thrust the molded egg container from off the mold.

Figure 13:
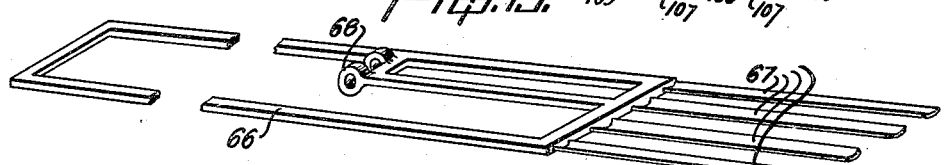
Fig. 13 is a perspective view of the carrier for delivering the molded articles from the molding machine to the drier conveyer.

For receiving the freshly molded egg containers 65 when they are thrust off the male molds I provide a pair of slidable carriers of the type illustrated in Fig. 13. These carriers each consist of a rectangular frame 66 furnished at its outer or container receiving end with a plurality of outwardly extending container receiving fingers 67. Intermediately of the length and width of the frame 66 I form a journal 68 by means of which the carrier is linked to an actuating lever. For supporting these carriers I furnish four bracket members 69 which extend rearwardly and horizontally from the rear edge of the top plate 25, such brackets being spaced to form two pairs as will be seen upon reference to Fig. 12. Extending downwardly from these brackets I furnish a plurality of hanger members 70 which are each furnished upon their inner face with spaced apart rollers 71, the sides of the carrier frame 66 extending between the rollers of each pair so that the carrier is free to slide to and fro on the rollers between the side plates 1.

Figure 14:
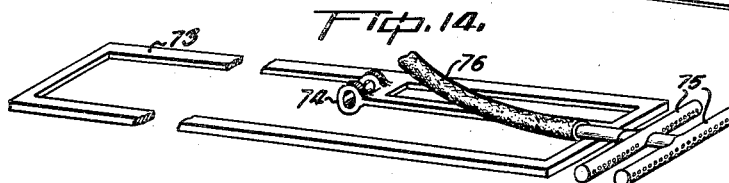
Fig. 14 is a perspective view of the spray carrier.

Below the pairs of rollers 71 upon the hanger members 70 I furnish pairs of rollers 72 which are positioned similarly to the rollers 71 and are adapted to receive and slidably support a pair of second frames of the type illustrated in Fig. 14. These frames which constitute the spray supports are of the same general form as the frames 66 in being rectangular in shape and furnished with bearings 74 intermediately of their length and width by means of which they are linked to the actuating levers. Upon the outer end of each frame 73 I support a perforated spray member 75 which is connected by means of a flexible conduit 76 with a water pipe 77 as illustrated in Fig. 22.

For actuating the frames 66 and 73 in their horizontal reciprocatory movement I furnish a shaft 78 which is mounted in a pair of brackets 79 extending from the rear edge of the side plates 1 in the vicinity of their lower ends. Upon this shaft I mount a pair of levers 80 which are secured to the shaft so that when one lever is swung the other swings in unison therewith. Centrally of the shaft 78 I freely mount a sleeve 81 and upon this sleeve secure a pair of levers 82 so that they also swing in unison but freely of the levers 80. The upper ends of the levers 80 and 82 are connected to the journals 68 and 74 in the frames 66 and 73 by means of links 83 and 84, so that any swinging movement of said levers causes the frames to reciprocate between their respective pairs of rollers.

For reciprocating said frames through the medium of the levers 80 and 82, I furnish a pair of cams 85 and 86, the cam 85 being formed with a groove 87 and a cam 86 formed with a groove 88. Extending between one of the levers 80, and the cam 85 I furnish an arm 89 which is pivotally connected at one end to the lever 80 in the vicinity of its bottom and at the other end furnished with a slot member 90 which is adapted to surround the shaft 91 upon which the cams are mounted, upon the face of the slotted member adjacent to the cam I provide a roller 92 which extends into the groove 87. For connecting one of the swingable levers 82 with the cam 86 I furnish an arm 93 which is of similar construction to the arm 89 and surrounds the shaft 91 at its inner slotted end, being furnished with a roller 94 which extends into the slot 86 of such cam.

The shaft 91 constitutes the main driving shaft in the machine and extends thereacross between the side plates 1 in the vicinity of their bottoms and intermediately of their widths. This shaft projects through the plates and is furnished upon the end illustrated in Fig. 3 with a gear wheel 95 which meshes with a gear 96 secured upon a stub shaft 97 freely mounted within a bracket 98 and furnished upon its opposite end with a belt pulley 99. This end of the shaft 91 is also provided with a bevel gear 198 which in turn meshes with a second bevel gear 199 carried upon a shaft 100 which extends to the carrier driving mechanism of the drier.

The water pipe 77 which extends to the spray members 75 through the medium of the flexible conduits 76 is furnished with a valve 101 which controls the flow of water through said pipes. This valve is actuated by means of an arm 102 which is linked to a swingable arm 103 pivotally extending from a projection 104° upon the valve to the arm 93. As the arm 93 oscillates under the movement of the cam 86 the arms 102 and 103 are swung to open and close the valve. For rotating the shaft 59 upon which the cams 58 are mounted I provide a bevel gear 104 upon the end of the shaft projecting through the bearing 60 which is mounted upon one of the side plates 1. This bevel gear meshes with a bevel gear 105 secured upon the top of a downwardly extending shaft 106 which is carried in bearings 107 and provided upon its lower end with a bevel gear 108 which meshes a bevel gear 109 upon the end of the shaft 91.

The valve 35 which is positioned in the vicinity of the rear edge of the top plate 25 and connected to the necks 34 of the male mold boxes 32 by means of flexible conduits 110 is actuated by a cam 111 positioned upon a shaft 59. 112 is a rocker arm pivotally mounted upon a bracket 113 and furnished upon one end with a roller 114 which rides upon the cam 111. The other end of this rocker arm is connected to a link 115 which is in turn connected to an arm 116 which actuates the valve 35. Upon the top of the valve 35 I position a clapper valve 117 which admits atmospheric pressure to the male mold. This clapper valve is actuated by a lever 118 which is also pivoted upon the bracket 113 and provided with a roller 119 which rides upon a cam 120 also secured upon the shaft 59.

Upon reference to Fig. 9 it will be seen that the cross pipe 13 which is positioned intermediately of the height of the rear edges of the plates 1 is connected by means of a conduit 121 to a valve 122 and also by a small conduit 123 to a valve 124, such valve 124 being connected with a by-pass pipe 125 which extends therefrom to a main pipe 126 which communicates with one of the openings of the valve 122. Underneath the valve 122 and in communication therewith a clapper valve 127 is furnished, the three valves 122, 124, and 127 being actuated by a plurality of cam faces secured upon a disc 128 which is mounted upon the shaft 91.

The valve 122 which is of the three-way type is actuated by means of a bell crank lever 129 which is pivotally mounted upon a bracket 130. One end of this lever is connected to the valve actuating lever 131 and at the other end furnished with a roller 132 which rides upon cam faces 133 and 133ª upon the disc 128.

For actuating the by-pass valve 124 I furnish a crotch member 134 which rides in and straddles a grooved member 135 positioned upon the shaft 91 in proximity to the disc 128. Upon the disc 128 I furnish a pair of cam faces 136 and 136ª, and upon the adjacent face of the crotch member 134 furnish a roller 137 which rides upon such cam faces. The upper end of the crotch member 134 is pivotally connected to a swingable arm 138 pivotally mounted upon a bracket 139 and connected at its other end to an arm 140 which actuates the valve 124. The clapper valve 127 is actuated by a lever 141 pivotally mounted upon a bracket 142 and furnished upon one end with a roller 143 which engages a cam face 144 upon the disc 128. The other end of the lever 141 is connected to a link 145 which is in turn connected to an arm 146 which actuates the clapper valve stem 147.

I have not specifically described the construction of the various valves as they are of standard well-known types and obvious to any one skilled in the art, a specific description of the valves tending to complicate the general description of my device. I also wish to draw attention to the fact, that I can if necessary actuate the carrier frame 66 and fingers 67 from the discharge side of the molding machine, whereby the fingers would travel from such discharge side inwardly to receive the molded pulp and move outwardly to deliver the molded pulp to the drier conveyer.

My drier into which the molded egg containers are delivered for drying consists of a chamber 148 open at its front and rear ends 149 and 150. The drying chamber is heated by a plurality of suitably positioned steam pipes 151 following conventional practice in design and fed from a steam supply pipe 152. Interiorly of the chamber I position a pair of horizontal endless conveyers 153 and 154 which are mounted upon two pairs of sprocket wheels 155 and 156. These sprocket wheels are spaced apart from one another as illustrated in Fig. 4, and carried upon two transverse shafts 157 which are positioned one at each end of the chamber 148 intermediately of its height, being supported in bearings 158, which are mounted upon longitudinal extending vertical channels 159. One end of each of the shafts 157 is furnished with a sprocket wheel 160, and 161 and 162 are a pair of worm gear boxes provided with sprocket wheels 163 which are connected to the sprockets 160 by sprocket chains 164. The shaft 100 which extends from the molding machine to the gear 161 drives the sprocket chain 164 and a second shaft 165 which extends from the worm gear 161 to the worm gear 162, and drives the sprocket chains 164 which extends from the second gear box.

Figures 15, 16:
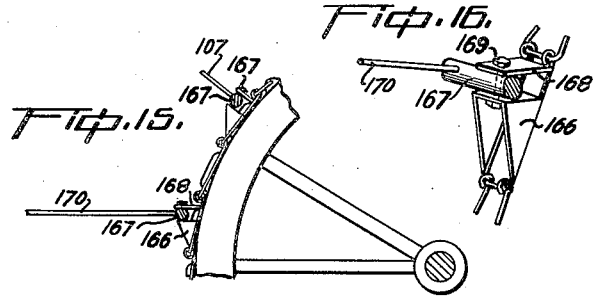
Fig. 15 is a side elevational view of a fragmentary portion of one of the sprocket wheels carrying one of the conveyer chains in the drier, a fragmentary portion of one of such chains being shown upon the wheel.
Fig. 16 is a perspective view of a fragmentary portion of the chain.

My conveyers 153 and 154 which extend around the sprockets 155 and 156 are of link form as illustrated in Figs. 15 and 16, each alternate corresponding link of each pair of sprocket chains being furnished with an outwardly extending triangular member 166 to which a cross bar 167 is secured by means of a plate 168 and a bolt 169 which extends through the plate, cross bar, and triangular member. A plurality of fingers 170 extend outwardly from each cross bar, being so inclined to their supporting links that when they each come around to a position immediately beneath the carrier fingers 67 they lie substantially parallel thereto and lift the molded egg container therefrom in a substantially horizontal position, it being understood that the conveyers move in an anti-clockwise direction as seen in Fig. 21. The conveyers upon passing from the sprocket wheels 155 and 156 ride upon upper and lower horizontal tracks 171, the ends of the cross bars 167 being provided with rollers 172 which ride upon the tracks. Upon further reference to this figure it will be perceived that as soon as the outwardly extending fingers 170 pass between the carrier fingers 67 lifting the egg container off such carrier fingers that they commence to swing upwardly until they assume an inclined position upon going through the drier. This is an important feature of my construction as it permits the drier to be made much shorter than would be the case if the egg containers were fed horizontally thereinto and laid edge to edge upon the container instead of face to face.

The operation of my device is as follows:—

I will assume that an egg container has just been molded and delivered to the drier conveyer and that the carrier frame 66 has returned to the opposite end of its stroke and that the female mold has moved downwardly and has just submerged in the pulp liquid in the tank 2, the shaft 91 as illustrated in Fig. 9 rotating in a clockwise direction. As the female mold approached its submersion point the disc 128 upon the shaft 91 was rotating so that the cam 136 came into contact with the roller 137 on the crotch member 134 and lifted such crotch member thereby swinging the arm 138 so that the by-pass valve 124 opened just as the female mold became submerged. As the main pipe 126 is connected to a suitable source of vacuum, the opening of the valve 124 will of course cause a certain suction through the drainage orifices 20 in the mold 18, from thence through the orifice 17 in the mold box to the bore 11 of the barrel 10 and from thence through the flexible conduit 12, through the open valve 124 and into the main suction pipe 126 through the by-pass 125. This suction takes away a portion of the water in the liquid and leaves a certain deposit of pulp lying over the face of the mold 18. As the barrel 10 and female mold approach the bottom of their stroke the disc 128 revolving a further degree brings the shoulder of the cam 133 into contact with the roller 132 upon the bell crank lever 129 which swings the lever downwardly and moves the valve into the position illustrated in Fig. 23. This opening of the large valve of course permits the full force of the suction to reach the female mold through the valve 122, cross pipe 13, and flexible conduit 12 and up through the bore 11 to the mold.

The female mold then commences its upward movement through the pulp liquid, the disc 128 continuing its revolving movement until the roller 132 on the bell crank lever 129 leaves the cam 133 and comes into contact with the opposite cam 133ª which swings the lever in the opposite direction and closes the valve just before the mold emerges from the liquid. In the meantime the cam 136 has moved away from the roller of the crotch member 134 and the cam 136ª comes in contact therewith which moves such crotch member to move downwardly to close the by-pass valve 124. When the valve 122 is returned to the position illustrated in Fig. 9 wherein the suction is cut off and communication established from the female mold to the clapper valve 127 the cam 144 upon the disc 128 has moved into contact with the roller 143 of the clapper arm actuating lever 141 whereby such lever is swung and the clapper valve opened which permits the return of atmospheric pressure in the female mold.

Whilst the before described movement of the cams, valves and female mold has been taking place the cam 58 which was in the initial position such as illustrated in Fig. 1 and has moved around to the position illustrated in Fig. 8 wherein the female mold has moved up into contact with the male mold. At the moment that the molds engage the cam 111 is moved to a point wherein it swings the rocker arm 112 through the medium of the roller 114 and opens the valve 35 through the link connection 115 between the valve actuating lever 116 and the rocker arm 112. The valve 135 which controls communication between the source of suction and the male mold through the medium of the flexible conduit 110 permits such suction to enter the male mold and suck the molded egg carrier from out of the female mold through the medium of the orifices 39 in the male mold member 33 through which the fingers 38 extend.

The further rotation of the cam 58 in an anti-clockwise direction brings the top of the cam into engagement with the roller 62 on the lever 54 whereby such lever is swung upwardly about the rod 52 and through its connection with the slotted member 30 upon the top of the male mold supporting sleeve 29 lifts such male mold upwardly at the same time as the female mold is moved downwardly.

Whilst the before described movements of the male and female molds have been taking place the arms 80 and 82 have remained substantially in the positions illustrated in Fig. 1 due to the lost motion periods provided for upon the cams 85 and 86 which also, of course, rotate in a clockwise direction as viewed in Figs. 2 and 5. As the molds come apart, however, and the male mold moves upwardly the cam 85 reaches the motion period and the carrier frame 66 moves forwardly under the influence of the swingable lever 80 actuated by the arm 89 so that the fingers 67 of such carrier frame are positioned underneath the egg container carried by suction upon the male mold. At this moment the cam 120 upon the shaft 59 has rotated into the position whereby it actuates the lever 118 and opens the clapper valve 117 to admit atmospheric pressure to the interior of the male mold. At this moment the tripper member 64 upon the cam 58 has moved around so that it engages the roller 63 upon the lever 51 which extends to the rod 40 illustrated in Fig. 19 and when such engagement occurs the lever 51 becomes momentarily depressed against the resiliency of the spring 173 which is interposed between the lever 54 and the grooved member 30, thus moving the rod 40 downwardly through the sleeves 29 and the male mold box, which moves the fingers 38 outwardly through the orifices 39 thus thrusting the molded egg container into the fingers 67 of the carrier.

The carrier which has a period of lost motion at this point then resumes its travel and upon reaching the end of its stroke one of the sets of fingers 170 of the drier conveyer passes through the fingers 67 of the carrier and moves the container to take it into the drier. Whilst the female mold is traveling downwardly to become again submerged it pauses momentarily upon a lost motion portion of its cam and during that period the cam which actuates the spray carrying frame 73 and spray nozzle 75 reaches its peak point which causes the spray nozzle 75 to move rapidly to and fro across the face of the female mold. As actuation of the spray controlling valve 101 is controlled by the swinging movement of the arm 103 which is moved by the arm 93 actuating the spray frame, the movement of such arm 93 opens the valve, which permits the spray to play upon the face of the female mold during the to and fro travel of the nozzle 75. As before explained, spraying of the female mold washes off any particles of pulp that may have been left adhering thereto or clogging suction or drainage orifices. The female mold again submerges in the liquid pulp and the levers 80 and 82 move the carrier and spray frames to the rear extremities of their strokes and the molding operation of a new container commences.

As before explained the egg containers are carried through the drier in substantially vertical positions, and the speed of the conveyer and the length and height of the drier are so arranged that when the containers reach the opposite end they are dry and ready to be packed for shipment. As the conveyer swings downwardly at the rear end the containers slip from off the fingers where they are picked up and stacked.

From the foregoing description it will be seen that I have devised a molding machine and drier in which every operation is automatic and by so constructing my device wherein the mold has a substantially vertical reciprocatory movement in and out of the pulp mixture, I have produced a machine in which the articles made will follow a very close uniform standard. Furthermore, by the incorporation of a member sliding to and fro in a substantially horizontal direction between the mold and the drier conveyer I have simplified my construction, and by the use of my washing spray keep the mold free from clogged pulp. Although I have shown and described a particular embodiment of my invention it is to be understood that I can make such changes and alterations as I may deem necessary without departing from the spirit of my invention as set forth in the appended claims.

What I claim as my invention is:

1. In a molding machine of the character described, the combination with a liquid pulp container and a substantially hollow perforate mold connected to a source of suction and having a movement into and out of the liquid pulp, of a suction member adapted to come into contact with the mold for removing the molded pulp therefrom, and a carrier slidable into and out of the path of movement of the mold for receiving the molded pulp from the suction member.

2. In a molding machine of the character described, the combination with a liquid pulp container and a substantially hollow perforate mold connected to a source of suction and having a movement into and out of the liquid pulp, of a suction member adapted to come into contact with the mold for removing the molded pulp therefrom, a carrier slidable into and out of the path of movement of the mold for receiving the molded pulp from the suction member, and releasing means incorporated in the suction member for delivering the molded pulp therefrom onto the carrier.

3. In a molding machine of the character described, the combination with a liquid pulp container and a substantially hollow perforate female mold connected to a source of suction, of means for imparting a substantially vertical reciprocatory movement to the mold into and out of the liquid pulp, a hollow perforate male mold adapted to come into contact with the female mold for removing the molded pulp therefrom, a carrier slidable into and out of the path of movement of the female mold, and releasing means co-operating with the male mold for delivering the molded pulp therefrom onto the carrier.

4. In a molding machine of the character described, the combination with a liquid pulp container and a mold having a movement into and out of the liquid pulp, of a suction member having a vertical reciprocatory movement adapted to come into contact with the mold for removing the molded pulp therefrom, a valve for controlling the air pressure in the suction member, a movable carrier for receiving the molded pulp from the suction member, and a synchronized mechanism actuating the carrier and the suction valve whereby the carrier moves underneath the suction member to receive the molded pulp as the suction is cut off.

5. In a molding machine of the character described, the combination with a liquid pulp container and a mold movable into and out of the pulp liquid, of a suction member adapted to come into contact with the mold for receiving the molded pulp therefrom, a valve controlling the air pressure in the suction member, a thrust mechanism incorporated within the suction member for removing the molded pulp therefrom, a synchronized mechanism between the suction valve and the thrust mechanism whereby atmospheric pressure is obtained in the suction member as the thrust member is actuated to remove the molded pulp, and a carrier movable into proximity with the suction member for receiving the molded pulp which is thrust therefrom.

6. In a molding machine of the character described, the combination with a liquid pulp container and a mold movable into and out of the liquid pulp, of a molded pulp removing suction member having a plurality of orifices in its mold contacting face, a plurality of thrust fingers contained within the suctioned member and projecting into said orifices, means for actuating the fingers whereby they move outwardly through the orifices to thrust the molded pulp from off the contacting face, a suction valve for controlling the air pressure within the suction member and a synchronized mechanism controlling the actuation of the suction valve and the thrust fingers whereby atmospheric pressure is obtained in the suction member as the thrust fingers move outwardly to remove the molded pulp.

7. In a molding machine of the character described, the combination with a liquid pulp container and a substantially hollow perforate female mold connected to a source of suction and having a substantially vertical reciprocatory movement into and out of the pulp liquid, of a substantially hollow perforate male mold member connected to a source of suction and having a reciprocatory movement in alignment with the movement of the female member, a synchronized mechanism for actuating the said molds and controlling the suction pressures therein whereby the molds move into contact to transfer the molded pulp from the female mold to the male mold, and resilient means incorporated in the male mold mechanism whereby a resilient contact is obtained between the molds.

8. A machine of the character described having in combination, a liquid pulp container, a substantially hollow perforate female mold connected to a source of suction and having a reciprocatory movement into and out of the liquid pulp, a valve mechanism for controlling the suction pressure within the female mold, a male mold connected to a source of suction and reciprocable in alignment with the path of movement of the female mold, a valve mechanism for controlling the suction pressures within the male mold, a synchronized mechanism controlling the actuation of the molds and the movement of the valve mechanisms whereby the molds come into contact and the suction pressures in the female and male molds are reversed so that the molded pulp is transferred from the female mold to the male mold, a slidable carrier movable into and out of the path of movement of the molds and adapted to receive the molded pulp from the male mold, means for removing the molded pulp from the male mold onto the carrier, a drier chamber for receiving the molded pulp, and a conveyer for removing such molded pulp from the carrier into the chamber.

9. A machine of the character described, having in combination a liquid pulp container, a mold movable into and out of the liquid pulp and upon the face of which the pulp is molded, a second mold complementary to the first mold and adapted to contact with the face thereof to remove the molded pulp therefrom, a synchronized carrier movable underneath the second mold to receive the molded pulp therefrom, a plurality of fingers on said carrier upon which the molded pulp rests, a heated drier chamber for receiving the molded pulp, a substantially horizontal endless conveyer extending through the drier chamber, a plurality of aligned sets of fingers extending outwardly from the conveyer and adapted to pass between the fingers in the carrier to lift the molded pulp therefrom said conveyer fingers extending in a substantially horizontal direction whilst passing between the carrier fingers and swinging upwardly towards a vertical position upon leaving the carrier so that successive pulp molds lie face to face whilst passing through the drier.

10. In a machine of the character described, the combination with a device for molding pulp articles, and a drier for such molded pulp articles, of a movable carrier extending between the molding device and the drier and upon which the articles are delivered to the drier, a plurality of fingers extending from said carrier and upon which the molded articles are received, an endless conveyer extending through the drier, a plurality of sets of fingers extending from the conveyer and adapted to pass between the fingers of the carrier to lift the molded articles therefrom, said conveyer fingers extending in a substantially horizontal direction whilst passing between the fingers of the carrier and swinging into a substantially vertical position whilst passing through the drier.

11. In a molding machine of the character described, the combination with a liquid pulp container and a mold adapted to vertically move into and out of the liquid pulp, of a water spray adapted to play upon the face of the mold between its submersions, a suction member adapted to come into contact with the mold for removing the molded pulp therefrom, a carrier movable underneath the suction member and upon which the molded pulp is deposited, and a horizontally movable member carried across the face of the mold in synchronization with the carrier and upon which the spray is mounted.

12. In a molding machine of the character described, the combination with a liquid pulp container and a substantially hollow perforate mold reciprocable into and out of the pulp, of a suction conducting member supporting and extending to the hollow mold, a conduit extending from the suction conducting member to a source of suction, a valve mechanism in said conduit, a by-pass pipe extending past said valve mechanism, a second valve mechanism in the by-pass pipe, and means synchronized with the movement of the mold for alternately actuating both valve mechanisms whereby varying suction pressures are obtained within the mold during its submersion.

13. In a molding machine of the character described, the combination with a liquid pulp container and a substantially hollow perforate female mold reciprocable into and out of the pulp liquid, of a barrel reciprocable through the bottom of the liquid pulp container and carrying the female mold upon its upper end, a conduit extending from said barrel to a source of suction, a valve mechanism in said conduit, means synchronized with the movement of the female mold for actuating the valve mechanism whereby varying suction pressures in the female mold are obtained during its submersion, a substantially hollow perforate male mold connected to the source of suction and adapted to contact with the female mold to remove the molded pulp therefrom, a valve mechanism between the male mold and the source of suction, means for operating the valve mechanism of the two molds whereby the male mold sucks the molded pulp from off the female mold during their period of contact, a movable carrier synchronized in its function with the female mold and movable into and out of the path of movement of the female mold, releasing means co-operating with the male mold for delivering the molded pulp therefrom unto the carrier, a molded pulp drying chamber, an endless conveyer extending therethrough, and means on said endless conveyer for removing the molded pulp from off the carrier and passing it into the drier.

ROBERT FREDERICK MARTLIN.